United States Patent
Brunel et al.

(10) Patent No.: US 10,423,623 B2
(45) Date of Patent: Sep. 24, 2019

(54) HIERARCHY MODELING AND QUERY

(71) Applicants: Robert Brunel, Heidelberg (DE); Jan Finis, Munich (DE); Gerald Franz, Wiesloch (DE)

(72) Inventors: Robert Brunel, Heidelberg (DE); Jan Finis, Munich (DE); Gerald Franz, Wiesloch (DE)

(73) Assignee: SAP SE, Walldorf (DE)

( * ) Notice: Subject to any disclaimer, the term of this patent is extended or adjusted under 35 U.S.C. 154(b) by 658 days.

(21) Appl. No.: 14/614,859

(22) Filed: Feb. 5, 2015

(65) Prior Publication Data

US 2016/0232207 A1 Aug. 11, 2016

(51) Int. Cl.
G06F 16/22 (2019.01)
G06F 16/2455 (2019.01)
G06F 16/28 (2019.01)

(52) U.S. Cl.
CPC .... *G06F 16/24553* (2019.01); *G06F 16/2246* (2019.01); *G06F 16/282* (2019.01)

(58) Field of Classification Search
CPC ......... G06F 17/30327; G06F 17/30625; G06F 17/30958–17/30961; G06F 16/2246; G06F 16/322; G06F 16/9027
See application file for complete search history.

(56) References Cited

U.S. PATENT DOCUMENTS

| | | | | |
|---|---|---|---|---|
| 5,463,389 A * | 10/1995 | Klayman | ................ | G06T 9/005 341/106 |
| 5,530,957 A * | 6/1996 | Koenig | ............. | G06F 17/30961 |
| 5,790,863 A * | 8/1998 | Simonyi | ................... | G06F 8/30 700/83 |
| 6,480,857 B1 * | 11/2002 | Chandler | .......... | G06F 17/30595 707/792 |
| 6,704,736 B1 * | 3/2004 | Rys | ..................... | G06F 17/3061 |
| 6,850,951 B1 * | 2/2005 | Davison | ............ | G06F 17/30961 707/792 |
| 9,002,859 B1 * | 4/2015 | Ward | ................ | G06F 17/30961 707/754 |
| 2002/0083033 A1 * | 6/2002 | Abdo | .................. | G06F 17/3061 |
| 2004/0015486 A1 * | 1/2004 | Liang | ................ | G06F 17/30958 |
| 2004/0134440 A1 * | 7/2004 | Da | .......................... | A01H 1/02 119/174 |

(Continued)

OTHER PUBLICATIONS

Celko, Joe: "Joe Celko's Trees and Hierarchies in SQL for Smarties", Elsevier, Inc., 2012, ISBN: 978-0-12-387733-8, 277pgs.

(Continued)

*Primary Examiner* — Robert W Beausoliel, Jr.
*Assistant Examiner* — Nirav K Khakhar
(74) *Attorney, Agent, or Firm* — Buckley, Maschoff & Talwalkar LLC

(57) ABSTRACT

A system includes a stored table comprising a plurality of rows and at least one column, each of the plurality of rows associated with a node of a hierarchy, and one of the at least one columns implicity representing a position of a row's associated node within the hierarchy, wherein a Structured Query Language query is received and, response to the query, one or more values of the one of the at least one columns are determined and one or more properties of the hierarchy are determined based on the one or more values.

19 Claims, 6 Drawing Sheets

| | pre/size/level | ORDPATH | DeltaNI |
|---|---|---|---|
| A1 | (1, 6, 1) | 1 | [1, 14] |
| A2 | (8, 0, 1) | 3 | [15, 16] |
| B1 | (2, 0, 2) | 1, 1 | [2, 3] |
| B2 | (3, 1, 2) | 1, 3 | [4, 7] |
| B3 | (5, 2, 2) | 1, 5 | [8, 14] |
| C1 | (4, 0, 3) | 1, 3, 1 | [5, 6] |
| C2 | (6, 0, 3) | 1, 5, 1 | [9, 10] |
| C3 | (7, 0, 3) | 1, 5, 3 | [11, 12] |

(56) References Cited

U.S. PATENT DOCUMENTS

| | | | | |
|---|---|---|---|---|
| 2008/0281801 | A1* | 11/2008 | Larson | G06F 17/30595 |
| 2009/0222407 | A1* | 9/2009 | Takuma | G06F 17/30684 |
| 2015/0106079 | A1* | 4/2015 | Bostick | G06F 17/2775 |
| | | | | 704/9 |
| 2016/0092527 | A1* | 3/2016 | Kang | G06F 17/30958 |
| | | | | 707/756 |
| 2016/0110434 | A1* | 4/2016 | Kakaraddi | G06F 11/3604 |
| | | | | 707/602 |
| 2017/0060983 | A1* | 3/2017 | Ikawa | G06F 17/30705 |

OTHER PUBLICATIONS

Farber, Franz et al., "The SAP Hana Database—An Architecture Overview", Bulletin of the IEEE Computer Society Technical Committee on Data Engineering, 2012, 6pgs.

Finis, Jan et al., "DeltaNI: An Efficient Labeling Scheme for Versioned Hierarchical Data", SIGMOD'13, Jun. 22-27, 2013, ACM: 978-1-4503-2037-5, 12pgs.

Roeser, Mary Beth: "Oracle Database SQL Language Reference, 12c Release 1 (12.1)", E41329-09, Jul. 2014, 1903pgs.

Finkelstein, Shel J. et al., "Expressing Recursive Queries in SQL", ISO International Organization for Standardization, ISO/ICE JTC1/SC21 WG3 DBL-MCI, X3H2-96-075r1, Feb. 23, 1996, 120pgs.

"Information Technology—Database language—SQL, Part 2: Foundation (SQL/Foundation)", International Standard, Reference No. ISO/IEC 9075-2:2011(E), Fourth Edition, Dec. 15, 2011, 1472pgs.

Liu, Zhen Hua et al., "Native XQuery Processing in Oracle XMLDB", SIGMOD2005, Jun. 14-16, 2005, ACM 1-59593-060—Apr. 5, 2006, (pp. 828-833, 6 total pages).

Eisenberg, Andrew et al., "Advancements in SQL/XML", 2014, 8pgs.

Boncz, Peter et al., "MonetDB/XQuery: A Fast XQuery Processor Powered by a Relational Engine", SIGMOD 2006, Jun. 27-29, 2006, ACM 1-59593-256—Sep. 6, 0006, (pp. 479-490, 12 total pages).

Grust, Torsten et al., "Why Off-the-Shelf RDBMSs are Better at XPath Than You Might Expect", SIGMOD'07, Jun. 11-14, 2007, ACM 978-1-59593-686—Aug. 7, 0006, 9pgs.

"Information Technology—Database language—SQL, Part 14: XML-Related Specifications (SQL/XML)", International Standard, Reference No. ISO/IEC 9075-14:2011(E), Fourth Edition, Dec. 15, 2011, 458pgs.

Pal, Shankar et al., "XQuery Implementation in a Relational Database Systems", Proceedings of the 31st VLDB Conference, Trondheim, Norway, 2005, (pp. 1175-1186, 12 total pages).

Beyer, Kevin et al., "System Rx: One Part Relational, One Part XML", SIGMOD 2005, Jun. 14-16, 2005, ACM 1-59593-060—Apr. 5, 2006, (pp. 347-358, 12 total pages).

Nielsen, Paul et al, "Microsoft SQL Server 2008 Bible", Chapter 17: Traversing Hierarchies, 2011, (9780470257043), (cover 1 + pp. 399-433, 36 total pages).

Microsoft Developer Network, "My Collection", Chapter 1: Hierachical Data (SQL Server), 2014, 10pgs.

O'Neil, Patrick et al., "ORDPATHs: Insert-Friendly XML Node Labels", SIGMOD 2004, Jun. 13-18, 2004, ACM 1-58113-859—Aug. 4, 2006, (pp. 1-6, 6 total pages).

Morton, Karen et al., Pro Oracle SQL, The Expert's Voice in Oracle, 2013, ISBN-13 (electronic): 978-1-4302-3229-2, (pp. cover + i-xx + 1-575, 594 total pages).

Grust, Torsten: "Accelerating XPath Location Steps", ACM SIGMOD 2002, Jun. 4-6, ACM 1-58113-497—May 2, 2006, 12pgs.

Silberstein, Adam et al., "BOXes: Efficient Maintenance of Order-Based Lebeling for Dynamic XML Data", 2005, 15pgs.

Al-Khalifa, Shurug et al., "Structural Joins: A Primitive for Efficient XML Query Pattern Matching", Paper No. 409, 2002, 25pgs.

Grust, Torsten et al., "Staircase Joins: Teach a Relational DBMS to Watch its (Axis) Steps", Proceedings of the 29th VLDB Conference, Berlin, Germany, 2003, 12pgs.

Bruno, Nicolas et al., "Holistic Twig Joins: Optimal XML Pattern Matching", 2002, 29pgs.

\* cited by examiner

| id | pid | kind |
|---|---|---|
| A1 | NULL | compound |
| A2 | NULL | display |
| B1 | A1 | engine |
| B2 | A1 | engine |
| C1 | B1 | valve |
| C2 | B1 | rotor |
| C3 | B2 | compound |
| C4 | B2 | control |
| D1 | C3 | valve |
| D2 | C3 | rotor |
| D3 | C4 | cpu |

| Id | Level | Is_Leaf | Is_Root | Pre_Rank | Post_Rank |
|---|---|---|---|---|---|
| 'A1' | 1 | 0 | 1 | 1 | 10 |
| 'B1' | 2 | 0 | 0 | 2 | 3 |
| 'C1' | 3 | 1 | 0 | 3 | 1 |
| 'C2' | 3 | 1 | 0 | 4 | 2 |
| 'B2' | 2 | 0 | 0 | 5 | 9 |
| 'C3' | 3 | 0 | 0 | 6 | 6 |
| 'D1' | 4 | 1 | 0 | 7 | 4 |
| 'D2' | 4 | 1 | 0 | 8 | 5 |
| 'C4' | 3 | 0 | 0 | 9 | 8 |
| 'D3' | 4 | 1 | 0 | 10 | 7 |
| 'A2' | 1 | 1 | 1 | 11 | 11 |

*FIG. 5*

| | pre/size/level | ORDPATH | DeltaNI |
|---|---|---|---|
| A1 | (1, 6, 1) | 1 | [1, 14] |
| A2 | (8, 0, 1) | 3 | [15, 16] |
| B1 | (2, 0, 2) | 1, 1 | [2, 3] |
| B2 | (3, 1, 2) | 1, 3 | [4, 7] |
| B3 | (5, 2, 2) | 1, 5 | [8, 14] |
| C1 | (4, 0, 3) | 1, 3, 1 | [5, 6] |
| C2 | (6, 0, 3) | 1, 5, 1 | [9, 10] |
| C3 | (7, 0, 3) | 1, 5, 3 | [11, 12] |

HIERARCHY MODELING AND QUERY

BACKGROUND

Hierarchical data is naturally present in many aspects of business operations. For example, hierarchical data typically models both the reporting and geographical relationships between employees. Hierarchical data may be represented using tree and graph structures. However, due to the flat nature of the traditional relational model, handling hierarchical data using Structured Query Language (SQL) statements is difficult and inefficient.

Logic for hierarchy handling is therefore typically written into an application which runs within an application server. In most cases, hierarchies are represented in a database schema using a simple relational encoding, and converted into a custom-tailored format within the application, if needed. The most widespread encoding is a self-referencing table resembling an adjacency list. FIG. 1 is an example of such a table, which encodes the hierarchy of FIG. 2. Field id uniquely identifies each item in the hierarchy, and the hierarchical relationships are established by a self-reference pid associating each item with its respective parent item.

In order to utilize adjacency lists as shown in FIG. 1, conventional SQL-responsive database systems use Recursive Common Table Expressions (RCTEs) (see. e.g., S. J. Finkelstein, N. Mattos, I. Mumick, and H. Pirahesh, "Expressing recursive queries in SQL," *ANSI Document X3H2-96-075r1*, 1996) and techniques to define custom stored procedures. These tools exhibit usability and performance deficiencies, so the primary conventional alternative is to abandon the adjacency list model and implement a hierarchy encoding scheme manually, either on the relational level or within the application. Accordingly, this alternative lacks query engine support.

BRIEF DESCRIPTION OF THE DRAWINGS

FIG. 5 is a projection of hierarchy properties according to some embodiments.

DESCRIPTION

The following description is provided to enable any person in the art to make and use the described embodiments. Various modifications, however, will remain readily apparent to those in the art.

Generally, some embodiments operate to abstractly represent node positions within a table column having a new special-purpose data type (hereinafter referred to as "NODE"). Also included are extensions to the SQL query language comprising functions operating on the NODE values, plus Data Description Language (DDL) and Data Manipulation Language (DML) constructs for obtaining and manipulating a NODE column.

Figures 1, 2:
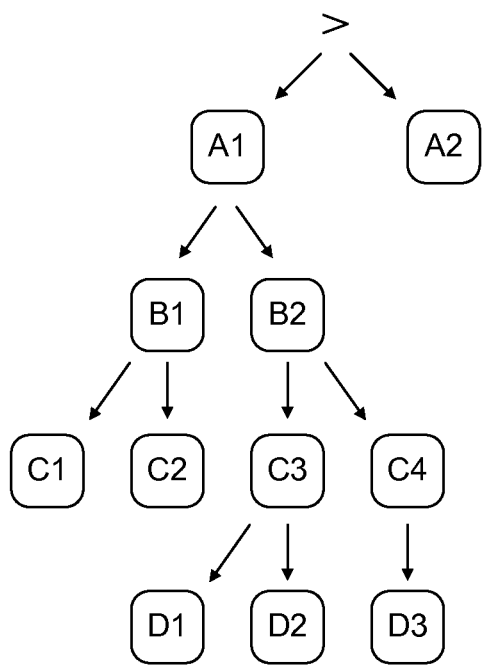
FIG. 1 illustrates an adjacency list.
FIG. 2 illustrates hierarchical data.
Figure 3:
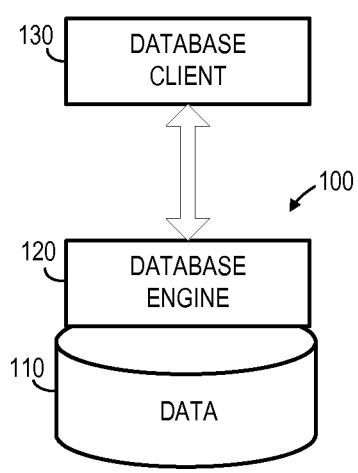
FIG. 3 is a diagram of an architecture according to some embodiments.

FIG. 2 is a block diagram of database system 100 according to some embodiments. FIG. 2 represents a logical architecture for describing systems according to some embodiments, and actual implementations may include more or different components arranged in other manners.

Database system 100 may comprise any query-responsive data source or sources that are or become known, including but not limited to a structured-query language (SQL) relational database management system. Database system 100 may comprise a relational database, a multi-dimensional database, an eXtendable Markup Language (XML) document, or any other data storage system storing structured and/or unstructured data. Data 110 of database 100 may be distributed among several relational databases, multi-dimensional databases, and/or other data sources. Embodiments are not limited to any number or types of data sources. For example, database 100 may comprise one or more OnLine Analytical Processing (OLAP) databases (i.e., cubes), spreadsheets, text documents, presentations, etc.

Database 100 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Data 110 of database 100 includes hierarchical data and, typically, non-hierarchical data. In some embodiments, data 110 comprises one or more of conventional tabular data, row-based data stored in row format, column-based data stored in columnar format, and object-based data.

Database 100 may store metadata regarding the structure, relationships and meaning of data 110. This information may include data defining the schema of database tables stored within data 110. A database table schema may specify the name of the database table, columns of the database table, the data type associated with each column, and other information associated with the database table.

Database 100 may also or alternatively support multi-tenancy by providing multiple logical database systems which are programmatically isolated from one another. Moreover, data 110 may be indexed and/or selectively replicated in an index to allow fast searching and retrieval thereof.

Database engine 120 performs administrative and management functions for database 100. Such functions may include snapshot and backup management, indexing, optimization, garbage collection, and/or any other database functions that are or become known. Database engine 120 may also implement a query engine for receiving queries from database client 130, retrieving data from data 110 based on the queries, and transmitting a query result back to database client 130.

Database client 130 may comprise one or more devices executing program code of a software application for presenting user interfaces to allow interaction with database system 100. For example, a user may manipulate such user interfaces to request particular data (e.g., for populating a spreadsheet, a graph, etc.). In response, client 130 executes program code of a software application to generate a query (e.g., a structured-query language (SQL) query) identifying the requested data, and to transmit the query to database engine 120. The query may relate to hierarchical data and may use one or more of the SQL extensions described herein.

Presentation of a user interface may comprise any degree or type of rendering. For example, client 130 may execute a Web Browser to receive a Web page (e.g., in HTML format) from data server 110, and may render and present the Web page according to known protocols. Client 130 may also or alternatively present user interfaces by executing a stand-alone executable file (e.g., an .exe file) or code (e.g., a JAVA applet) within a virtual machine. System 100 may include any number of clients 130 of one or more types according to some embodiments.

In the present description, the term hierarchy denotes an ordered, rooted, labeled tree, an example of which is shown in FIG. 2. "Labeled" indicates that each vertex in the tree has a label which represents the attached data. "Rooted" indicates that a specific node is marked as root, and all edges are conceptually oriented away from the root.

According to some embodiments, every hierarchy contains by default a single, virtual root node, which is denoted ">" and called the "super-root". As a virtual node, > is hidden from the user. The children of > are the actual roots in the data. This mechanism may avoid certain technical complications in handling empty hierarchies as well as hierarchies with multiple roots (i.e., so-called forests).

An "ordered" hierarchy is one in which a total order is defined among the children of each node. For many applications, the relative order of sibling nodes is not relevant. Some embodiments provide order-indifferent update operations to address this use case, but embodiments may nevertheless maintain an internal order. Consequently, order-based functionality such as preorder ranking is well-defined and deterministic.

In a database context, a hierarchy is not an isolated object but is associated with exactly one table. Conversely, a table might be associated with multiple hierarchies. The table of FIG. 1 is associated with one hierarchy (as shown in FIG. 2), which arranges its rows in a tree, thus adding a hierarchical dimension to the table. A table associated with at least one hierarchy will be referred to as a hierarchical table.

Let H be a hierarchy attached to a table T. Each row r of T is associated with at most one node v of H, so there may also be rows that do not appear in the hierarchy. Conversely, each node except for > is associated with exactly one row of T. The values in the fields of r can be regarded as labels attached to v or to the edge onto v. Besides the tree structure and a node—row association, H conceptually does not contain any data. A user never works with the hierarchy object H itself but only works with the associated table T. Consequently, a row-to-node handle is required to enable the user to refer to the nodes in H. Such a handle is provided by a column of type NODE in T.

A field of the predefined data type NODE represents the position of a row's associated node within the hierarchy. A table (row) may have two or more NODE fields and thus be associated with multiple distinct hierarchies. Using an explicit column to serve as a handle for a hierarchical dimension allows certain embodiments to expose all hierarchy-specific functionality through that column in a natural and lightweight way. The following pseudo-code illustrates exposure of the hierarchy of table 400 of FIG. 4, named BOM, and its NODE column, named pos:

```
SELECT id, ..., "level of pos"
FROM BOM
WHERE "pos is a leaf"
```

Compared to other approaches, such as a pseudo-column for each property of interest (similar to the LEVEL column in Oracle Hierarchical Queries (see, e.g., Oracle Database SQL language reference 12c release 1 (12.1) E17209-15. Oracle Corp. [Online]. Available: http://docs.oracle.com/cd/E11882 01/server.112/e26088/toc.htm)), or functions operating on table aliases (an idea mandated by early proposals for temporal SQL), the NODE field according to some embodiments implicates less syntactic impact and also simplifies certain aspects. For instance, transporting "hierarchy information" across a SQL view is a trivial matter of including the NODE column in a projection list of the defining SELECT statement. Furthermore, the functionality can be extended in the future by simply defining new functions operating on NODE.

According to some embodiments, actual values of data type NODE are opaque and not directly observable to a client. That is, a naked NODE field cannot be part of the output of a top-level query. In other words, a NODE value of a row represents "the position of this row in the hierarchy". How this position is encoded is intentionally left unspecified. This approach provides the back end with flexibility and optimization opportunities.

A client works with a NODE column exclusively by applying hierarchical functions and predicates such as "level of" and "is ancestor of". Additionally, in some embodiments, the NODE type supports the operators = and < >. Other operations such as arithmetic and casts from other data types are not supported. The system statically tracks the original hierarchy of each NODE column and ensures that binary predicates and set operations (e.g., UNION) do not mix NODE values from different hierarchies. NODE values can be NULL to express that a row is not part of the hierarchy. Non-null values encode a valid position in the hierarchy. The handling of NULL values during query processing is consistent with SQL semantics.

In order to support and facilitate complex queries, some embodiments enhance SQL's query language. As outlined above, a field of data type NODE serves as a handle to the nodes in the associated hierarchy. For the following examples, it is assumed that a table including such a field is available. The acquisition of such a table, either a hierarchical base table or a derived hierarchy, is described below.

The following built-in scalar functions operating on a NODE value v are provided to enable a client to query certain hierarchy properties:

LEVEL(v)—The number of edges on the path from > to v.
IS_LEAF(v)—Whether v is a leaf, i.e., has no children.
IS_ROOT(v)—Whether v is a root, i.e., its parent is >.
PRE_RANK(v)—The preorder traversal rank of v.
POST_RANK(v)—The postorder traversal rank of v.

FIG. 5 shows the result of projecting these hierarchy properties for table 400. The values of LEVEL, PRE_RANK, and POST_RANK are 1-based. There are certain clear equivalences. For example, IS_ROOT(v) is equivalent to LEVEL(v)=1 and thus may be considered redundant. However, for the sake of convenience and expressiveness a strictly orthogonal function set is not of primary importance.

The following example demonstrates how hierarchy properties are used. The example produces a table of all non-composite parts (i.e., leaves) and their respective levels:

```
SELECT id, LEVEL(pos) AS level FROM BOM
WHERE IS_LEAF(pos) = 1
```

As mandated by SQL semantics, the order of the result rows is undefined. To traverse a hierarchy in a particular order, one can combine ORDER BY with a hierarchy property. For example, consider a so-called parts explosion for the BOM, which shows all parts in depth-first order, down to a certain level:

Depth-first, depth-limited parts explosion with level numbers
SELECT id, LEVEL(pos) AS level FROM BOM
WHERE LEVEL(pos) <5
ORDER BY PRE_RANK(pos)

With PRE_RANK, parents are arranged before children (in preorder); with POST_RANK, children are arranged before parents (in postorder). Sorting in breadth-first search order can be done using the LEVEL property:

Breadth-first parts explosion
SELECT id, LEVEL(pos) AS level FROM BOM
ORDER BY LEVEL(pos)

Computing the actual pre- or post-order rank of a node is not trivial for many indexing schemes (e.g., ORDPATH). However, when PRE_RANK or POST_RANK appear only in the ORDER BY clause (which is their main use case), then there is no need to actually compute the values. For sorting purposes, pairwise comparison of the pre/post positions is sufficient, and all indexing schemes can handle this comparison efficiently.

Besides querying hierarchy properties, a general task is to navigate from a given set of nodes along a certain hierarchy axis. Such axes can be expressed using one of the following hierarchy predicates (with u and v being NODE values):

IS_PARENT(u,v)—whether u is a parent of v.
IS_CHILD(u,v)—whether u is a child of v.
IS_SIBLING(u,v)—whether u is a sibling of v, i.e., has the same parent.
IS_ANCESTOR(u,v)—whether u is an ancestor of v.
IS_DESCENDANT(u,v)—whether u is a descendant of v.
IS_PRECEDING(u,v)—true iff u precedes v in preorder and is not an ancestor of v.
IS_FOLLOWING(u,v)—true iff u follows v in preorder and is not a descendant of v.

Axis navigation maps quite naturally onto a self-join with an appropriate hierarchy predicate as join condition. For example, the following lists all pairs (u,v) of nodes where u is a descendant of v:

SELECT u.id, v.id
FROM BOM u
JOIN BOM v
ON IS_DESCENDANT(u.pos, v.pos)

As another example, a join may be used to answer a where-used query on BOM. The query "Where is part D2 used?" corresponds to enumerating all ancestors of said node:

SELECT a.id
FROM BOM p, BOM a
WHERE IS_ANCESTOR(a.pos, p.pos) AND p.id='D2'

The different predicates are inspired by the axis steps known from XPath. The IS_PRECEDING and IS_FOLLOWING predicates are only meaningful in an ordered hierarchy, and thus of less interest in the general case.

The previous section describes query primitives that work on a field of type NODE. The following section will describe how a field of type NODE is declared and maintained, beginning with constructs for deriving a Hierarchy from an Adjacency List.

Legacy applications may require a system to derive a hierarchy from an available table in the Adjacency List format. Derived hierarchies enable users to take advantage of all query functionality described herein "ad hoc" on the basis of relationally-encoded hierarchical data, while conforming to the query language (and in particular, without requiring schema modifications via DDL).

According to some embodiments, the HIERARCHY expression derives a hierarchy from a given adjacency-list-formatted source table, which may be a table, a view, or the result of a subquery:

HIERARCHY
USING source table AS source name
[START WHERE start condition]
JOIN PARENT parent name ON join condition
[SEARCH BY order]
SET node column name The HIERARCHY expression can be used wherever a table reference is allowed (in particular, a FROM clause). The result is a temporary table containing the data from the source table plus an additional NODE column named node column name. The expression is evaluated by first self-joining the source table in order to derive a parent-child relation representing the edges, then building a temporary hierarchy representation from that, and finally producing the corresponding NODE column. The START WHERE subclause can be used to restrict the hierarchy to only the nodes that are reachable from any node satisfying start condition. The SEARCH BY subclause can be used to specify a desired sibling order; if omitted, siblings are ordered arbitrarily. The procedure for evaluating the whole expression according to some embodiments is as follows:

1) Evaluate source table and materialize required columns into a temporary table T. Also add a NODE column named node column name to T.
2) Perform the join
   T AS C LEFT OUTER JOIN T AS P ON join condition, where P is the parent name and C is the source name. Within the join condition, P and C can be used to refer to the parent and the child node, respectively.
3) Build a directed graph G containing all row IDs of T as nodes, and add an edge $r_P \rightarrow r_C$ between any two rows $r_P$ and $r_C$ that are matched through the join.
4) Traverse G, starting at rows satisfying start condition, if specified, or otherwise at rows that have no (right) partner through the outer join. If order is specified, visit siblings in that order. Check whether the traversed edges form a valid tree or forest, that is, there are no cycles and no node has more than one parent. Raise an error when a non-tree edge is encountered.
5) Build a hierarchy representation from all edges visited during 4) and populate the NODE column of T accordingly. The result of the HIERARCHY expression is T.

The description above is merely conceptual and an example of an implementation according to some embodiments is described below. As described, an error is raised when a non-tree edge is encountered. This ensures the resulting hierarchy has a valid tree structure. "Nonstrict" hierarchies may be supported by deriving a spanning tree over G, with various options controlling the way the spanning tree is chosen.

In comparison to a RCTE, the semantics HIERARCHY expression are quite different in that only a single self-join is performed on the input rather than a recursive join. This may allow for a more efficient evaluation algorithm compared to a recursive join. Furthermore, the HIERARCHY expression only defines a hierarchy, which can be queried by wrapping the expression into a SELECT statement. In contrast, a RCTE both defines and queries a hierarchy in one convoluted statement.

As an example, the following statement uses a HIERARCHY expression to derive the pos column from id and pid of the FIG. 1 table, then selects the id and level of all parts that appear within part C2:

```
WITH PartHierarchy AS (
    SELECT id, pos
        FROM HIERARCHY USING BOM AS c
        JOIN PARENT p ON p.id = c.pid
        SET pos
)
SELECT v.id, LEVEL(v.pos) AS level
    FROM PartHierarchy u, PartHierarchy v
    WHERE u.id = 'C2'
        AND IS_DESCENDANT(v.pos, u.pos)
```

PartHierarchy could be extracted into a view and reused for different queries. One might argue that a RCTE or an Oracle Hierarchical Query could as well be placed in a view, but that would still not result in a clear definition/query separation, because any potentially needed hierarchy properties (such as LEVEL in the example) would have to be computed in the view definition even though they are clearly part of the query. A query that does not need the level would still trigger its computation, resulting in unnecessary overhead. In contrast, some embodiments allow for deferring the selection of hierarchy properties to the query.

Derived hierarchies as discussed in the previous section are targeted mainly at legacy applications. For newly-designed applications one approach is to express and maintain a hierarchy explicitly in the table schema. Embodiments may provide specific DDL constructs for this purpose. The user can include a hierarchical dimension in a base table definition:

```
CREATE TABLE T (
    ...,
    HIERARCHY name [NULL|NOT NULL] [WITH (option*)]
)
```

This implicitly adds a column named name of type NODE to the table, exposing the underlying hierarchy. Explicitly adding columns of type NODE is prohibited. A hierarchical dimension can also be added to or dropped from an existing table using ALTER TABLE. Like a column, a hierarchical dimension can optionally be declared nullable. If it is declared NOT NULL, the implicit NODE value of a newly inserted row is DEFAULT, making it a new root without children. A row with a NULL value in its NODE field is not part of the hierarchy.

A hierarchy that is known to be static allows the system to employ a read-optimized indexing scheme. Therefore, the user is provided with a way of controlling the degree to which updates to the hierarchy are to be allowed. This is done through an option named UPDATES:
UPDATES=BULK|NODE|SUBTREE BULK allows only bulk-updates; NODE allows bulk-updates and single-node operations, that is, relocating, adding, and removing single leaf nodes; SUBTREE allows bulk-updates, single-node operations, and the relocation of whole subtrees. A BULK dimension is basically static; individual updates are prohibited. A distinction is made between single-node and subtree updates, because subtree updates require a more-powerful dynamic indexing scheme than single-node updates, with inevitable tradeoffs in query performance. Depending on the option, the system chooses an appropriate indexing scheme for the hierarchical dimension. The default setting is SUBTREE, so full update flexibility is provided unless restricted explicitly by the user.

For legacy application support, a smooth transition path from relationally encoded hierarchies (i.e., adjacency lists) to full-fledged hierarchical dimensions is desired. In a first stage, most legacy applications may rely entirely on views featuring HIERARCHY expressions on top of adjacency lists, thus avoiding any schema changes. Hence, bulk-building is, at least conceptually, used on each view evaluation; though it may be elided often in practice, in systems which employ view caching.

In a second stage, a partly adapted legacy application might add a static (UPDATES=BULK) hierarchical dimension alongside an existing adjacency list encoding, and update the dimension periodically from the adjacency list via an explicit bulk-update. A bulk-update is issued by using a HIERARCHY expression as source table of a MERGE INTO statement.

These two stages provide a way to gradually adopt hierarchy functionality in a legacy application, but they come at the cost of frequently performing bulkbuilds whenever the hierarchy structure changes. Therefore, for greenfield applications as well as for fully migrated legacy applications, a dynamic hierarchy (UPDATES=NODE or SUBTREE) supporting explicit, fine-grained updates via special-purpose DML constructs is preferable.

In order to employ a minimally invasive syntax, ordinary INSERT and UPDATE statements operating on the NODE column of a hierarchical dimension are used to express updates.

In particular, an anchor value is used to specify the position where a new row is to be inserted into the hierarchy. Rather than extending the SQL grammar, new built-in functions are defined that take a NODE as input and yield an anchor. An anchor can be used as value for the NODE field in an INSERT statement. Embodiments may support the following anchor functions:

BELOW(v) inserts the new row as child of v. The insert position among siblings is undefined.
BEFORE(v) or BEHIND(v) insert the new row as immediate left or right sibling of v.

Figure 4:
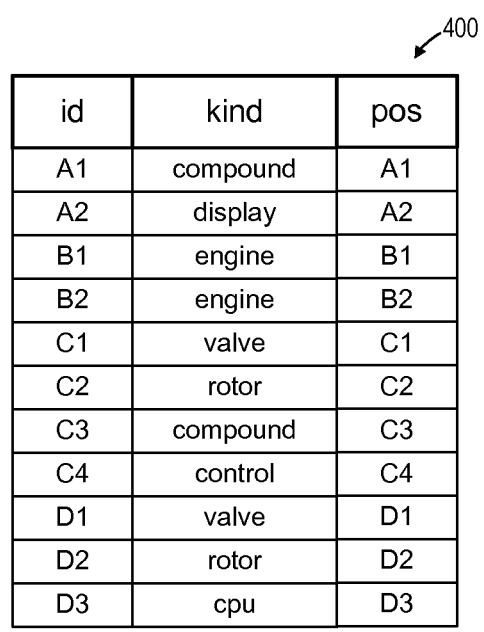
FIG. 4 is a table including a column of type NODE according to some embodiments.

For example, a node B3 may be added as new child of A2 into the hierarchy of FIGS. 2 and 4 using:

```
INSERT INTO BOM (id, pos)
VALUES ('B3', BELOW(
    SELECT pos FROM BOM WHERE id = 'A2'))
```

The BELOW anchor is useful for unordered hierarchies, while the BEFORE and BEHIND anchors allow for precise positioning among siblings in hierarchies where sibling order matters.

The user can also use DEFAULT to make the new row a root, or NULL (for nullable dimensions) to omit it from the hierarchy.

Relocating a node v is done by issuing an ordinary UPDATE on the NODE field of the associated row, again using an anchor to describe the node's target position. If v has any descendants, they are moved together with v, so the whole subtree rooted at v is relocated. Relocating a subtree is only allowed if option UPDATES=SUBTREE is used for the hierarchical dimension. In order to guarantee structural integrity, the system prohibits relocation of a subtree below a node within that same subtree, as this would result in a cycle.

A node can be removed from a hierarchy by either deleting its row or setting the NODE field to NULL. However, these operations are prohibited if the node has any descendants that are not also removed by the same transaction. To remove a node with descendants, all children have to be relocated first or removed with that node. While this ensures that removing nodes does not leave behind an invalid hierarchy, it is restrictive: If a hierarchical dimension uses option UPDATES=BULK, the only rows that may be deleted are those whose NODE value is NULL; the user is prevented from deleting any rows that take part in the hierarchy. To make easy row deletion possible in this case, truncating the whole hierarchy is allowed by setting the NODE value of all rows to NULL within the same transaction. Then, rows may be deleted at will, and subsequently the hierarchy can be rebuilt (bulk-built) from scratch. These rules ensure that the structure of the hierarchy remains valid at any time.

In certain applications an entity might be designed to belong to two or even more hierarchies. For example, an employee might have both a disciplinary superior as well as a line manager, and thus be part of two reporting lines. A straightforward way to model this is to use two hierarchical dimensions:

```
CREATE TABLE Employee ( id INTEGER
PRIMARY KEY, ...,
    HIERARCHY disciplinary,
    HIERARCHY line
)
```

A more complex case arises when a hierarchy shall contain certain rows more than once. Again, a bill of materials is a good example: A common part such as a screw generally appears multiple times within the same BOM, and it is not desirable to replicate its attributes each time. This is a typical 1:n relationship: one part can appear many times in the hierarchy. To blend the present data model with SQL, the solution is to model this case as one would model 1:n relationships in SQL, namely by introducing two relations and linking them by means of a foreign key constraint. Thus, we separate the schema from FIG. 2 into per-part data Part and a separate BOM table:

```
CREATE TABLE Part ( id INTEGER PRIMARY KEY,
kind VARCHAR(16), price
INTEGER, ... -- master per-part data
)
CREATE TABLE BOM ( node_id INTEGER PRIMARY
KEY, HIERARCHY pos,
part_id INTEGER, -- a node is a part (N:1)
FOREIGN KEY (part_id) REFERENCES Part (id),
... -- additional node attributes
)
```

Often, entities of different types are mixed in a single hierarchy. "Different types" means that the entities are characterized by different sets of attributes. Especially in XML documents, it is common to have various node types (i.e., tags with corresponding attributes), and XPath expressions (see, e.g., T. Grust, J. Rittinger, and J. Teubner, "Why off-the-shelf RDBMSs are better at XPath than you might expect," in *SIGMOD,* 2007) routinely interleave navigation with filtering by node type (so-called node tests). The SQL way of modeling multiple entity types is to define a separate table per entity type, each with an appropriate set of columns. Returning to BOM, the Part-BOM data model may be further enhanced with master data specific to engines:

```
CREATE TABLE Engine ( id INTEGER PRIMARY
KEY, FOREIGN KEY (id)
REFERENCES Part (id), power INTEGER, ... -- master data
)
```

While Part contains master data common to all parts, Engine adds master data that is specific to parts of kind "engine". Both tables necessarily share their primary key domain (id). BOM is now a heterogeneous hierarchy in that each node has a type: it is either a general Part or an Engine. This design is extensible. Further part types can be added by defining further tables like Engine with 1:1 relationships to Part.

While working with a BOM, the user can use type-specific part attributes for filtering purposes simply by joining in the corresponding master data. As an example, suppose that fittings by manufacturer X have been reported to wear out too quickly when used in combination with engines more powerful than 700 watts, and the compounds that contain this hazardous combination need to be determined in order to issue a recall. The solution is below, in which the BOM—Engine join implies the test that node e is of kind 'engine'.

SELECT *
    FROM BOM c,—compound node
    Part cm,—compound master data
    BOM f,—fitting node
    Part fm,—fitting master data
    BOM e,—engine node
    Engine em—engine master data
WHERE c.id=cm.id
AND cm.kind='compound'
AND IS_DESCENDANT(f.pos, c.pos)
AND f.id=fm.id
AND fm.kind='fitting'
AND fm.manufacturer='X'
AND IS_DESCENDANT(e.pos, Epos)
AND e.id=em.id
AND em.power>700

A major use case for hierarchies is arranging some keys that are used as dimensions for a fact table. Measures associated with the facts are to be aggregated alongside the dimension hierarchies. As an example, consider a sales table recording, besides a certain sales amount and other attributes, the store where each sale took place. Suppose stores are arranged in a geographic hierarchy. The schema is:
Sale: {[store_id, date,amount, . . . ]}
Store: {[id, location_id, . . . ]}
Location: {[id, pos, name, . . . ]}

By joining Sale—Store—Location, we can associate each sale with a NODE value (Location.pos) of the location hierarchy indicating where the sale took place. Suppose we would like to answer the query: "Considering only sales within Europe, list the total sales per sub-subregion." This query speaks, quite implicitly, of three distinct Location nodes: a reference node u, namely Europe; the set of nodes V two levels below u, corresponding to the sub-subregions; and the sets of nodes $W_v$ below each $v \in V$, corresponding to locations of stores where a sale took place. The example is explicitly interested in the nodes in V, but also needs a name for a node $w \in W_v$ in order to specify the association of w to a sale, so that a sum over the sales amount may be ultimately computed. All in all, three self-joined instances of the hierarchical table are required:

```
SELECT v.id, SUM(sale.amount)
    FROM Location u, Location v, Location w, Store store, Sale sale,
    WHERE u.name = 'Europe'
      AND IS_DESCENDANT(v.pos, u.pos)
      AND LEVEL(v.pos) = LEVEL(u.pos) + 2
      AND IS_DESCENDANT(w.pos, v.pos)
      AND IS_LEAF(w.pos) = 1 -- store locations are leaves
      AND w.id = store.location_id
      AND store.id = sale.store_id
    GROUP BY v.id;
```

Note the straightforward reading direction, which intuitively matches the direction of navigation in the hierarchy. This example and the SELECT * example above show how the present language extensions maintain the join "look and feel" of SQL, so even large queries are familiar to SQL programmers.

On the back-end side, the hierarchy indexing scheme implements the functionality underlying each hierarchical dimension. No single scheme can serve all application scenarios equally well. Thus, the present design leaves the choice among different indexing schemes up to the system. Each scheme comes with a set of built-in implementations of the hierarchy functions (e.g., LEVEL). For efficient query processing, hierarchy-aware join operators are employed that work well with all supported indexing schemes. The bulk-building operation is in large parts common to all indexing schemes, and for supporting derived hierarchies and thus legacy applications.

According to some embodiments, a hierarchy indexing scheme comprises the content of a NODE column and possibly an auxiliary data structure. It contains the hierarchy structure as non-redundant information. This is in contrast to traditional indexes such as B-trees, which are entirely redundant auxiliary data structures. The data which is actually stored in the NODE column depends on the chosen indexing scheme, which is why NODE has been explicitly specified as opaque to the user.

Indexing schemes of varying complexity and sophistication are conceivable: Among the simplest indexing schemes are those based on labeling schemes; they are "simple" in that the labels can be stored directly in the NODE column (and possibly indexed using ordinary database indexes); no special-purpose data structures are required. Labeling schemes have been studied extensively in the XML context. Two prominent subcategories are order-based schemes and path-based scheme. A simple effective order-based variant, the pre/size/level (PSL) scheme, labels each node with its preorder rank, subtree size, and level. Path-based schemes comparable to ORDPATH may also be implemented.

Other, more sophisticated indexing schemes rely on auxiliary structures. These may represent the hierarchy information in special-purpose data structures, and the NODE column contains handles into those structures.

The choice among indexing schemes matters particularly with regard to their varying degrees of support for updates. For example, while the PSL scheme allows for an efficient evaluation of queries, it is totally static: Even a single-node update can, in general, necessitate changes to O(n) labels of other nodes. This is obviously not feasible for large hierarchies. More complex schemes, on the other hand, trade off query processing efficiency and in return support update operations to a certain degree. DeltaNI, for example, supports even complex update operations, such as relocating an entire subtree, in O(logn) time and incidentally brings along versioning support.

Figure 6:
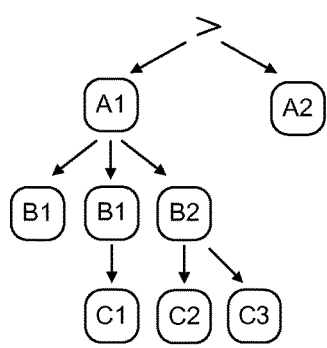
FIG. 6 illustrates hierarchical data and three columns of type NODE according to some embodiments.

FIG. 6 illustrates a hierarchy and the corresponding contents of a possible NODE column for each of a pre/size/level (see, e.g., P. Boncz, T. Grust, M. Van Keulen, S. Manegold, J. Rittinger, and J. Teubner, "MonetDB/XQuery: A fast XQuery processor powered by a relational engine," in *SIGMOD*, 2006), ORDPATH (see, e.g., P. O'Neil, E. O'Neil, S. Pal, I. Cseri, G. Schaller, and N. Westbury, "ORDPATHs: Insert-friendly XML Node Labels," in *SIGMOD*, 2004) and DeltaNI (see, e.g., J. Finis, R. Brunel, A. Kemper, T. Neumann, F. Farber, and N. May, "DeltaNI: An efficient labeling scheme for versioned hierarchical data," in *SIGMOD*, 2013) indexing scheme.

The indexing scheme may be chosen by the DBMS per hierarchical dimension, transparently to the user. The user may indirectly influence the choice through the UPDATES option. Some embodiments determine the indexing scheme as follows: For derived hierarchies, which are by design static, and for immutable hierarchical tables (UPDATES=BULK), the choice is PSL. If the user requires support for complex updates (SUBTREE), as well as for system-versioned tables, the choice is DeltaNI. For ordinary, non-versioned tables, and if the user settles for simple updates (NODE), the path-based scheme is chosen.

Some embodiments are extensible and flexible in that they anticipate further indexing schemes to be plugged in. The user is not burdened with the decision for the optimal scheme; it is up to the DBMS to pick among the available alternatives.

Hierarchy Functions in the SQL statement are translated into operations on the underlying index. Consequently, every indexing scheme provides the necessary operations. For example, consider the LEVEL function: with PSL, the result can be decoded directly from the given NODE value; with a path-based scheme, the number of elements in the path are counted. The set of functions described herein have been selected to cover many important use cases and, at the same time, make it possible to evaluate the functions efficiently on most existing indexing schemes proposed in the literature.

Updates involving nodes are propagated to the index implementations, which update the NODE column and the auxiliary data structures accordingly.

Like functions, binary predicates such as IS_DESCENDANT can be translated into invocations of the underlying index. But this is not adequate if they are used as join conditions, since the query optimizer would have to resort to nested-loops-based join evaluation. Therefore, the optimizer is enhanced such that joins involving a hierarchy predicate are translated into efficient hierarchy-aware physical join operators. Various hierarchy-aware join operators have been proposed in the literature, mostly for XPath processing. Basically any of these operators can be used, with slight adaptions to account for SQL semantics. An XPath axis step, for example, is implicitly a semi-join and performs duplicate elimination. With SQL, support for general joins is required, and duplicate elimination is not necessary in the default case.

Some embodiments make extensive use of the bulkbuilding operation for derived hierarchies on one hand, and for bulk-updates via MERGE on the other hand. A goal is an efficient implementation of the HIERARCHY expression, defined as below:

HIERARCHY
USING source table AS source name
[START WHERE start condition]
JOIN PARENT parent name ON join condition
[SEARCH BY order]
SET node column name Virtually any indexing scheme can be built straightforwardly during a depth-first traversal of the input hierarchy.

Thus, the main task of the bulk-build algorithm is to transform the adjacency list from the input table into an intermediate representation that supports efficient depth-first traversal. Building the intermediate representation is common to all indexing schemes; only the final traversal is index-specific. Existing relational operators may be reused for as many aspects as possible, adding as little new code as necessary. The algorithm proceeds as follows:

(Step a.) source table is evaluated and the result is materialized into a temporary table T, using an ordinary TEMP operator. To construct the hierarchy edges, we evaluate T AS C LEFT OUTER JOIN T AS P ON join condition. The left join input C represents the child node and the right input P the parent node of an edge. Since it is an outer join, children without a parent node are also selected. In the absence of a start condition, these nodes are by default the roots of the hierarchy. The row IDs $r_P$ and $r_C$ of both join sides are included in the result for later use. $r_P$ can be NULL due to the outer join. If order is specified, an ordinary SORT operator is used to sort the join result. Next, all columns except for $r_P$ and $r_C$ are removed, resulting in a stream of parent/child pairs (i.e., edges) in the desired sibling order. Next, building and traversing the intermediate representation is taken over by a new operator, hierarchy build β.

(Step b.) β first materializes all edges into an array and then sorts this array by $r_P$. Because all row IDs $r_P$ are in the range 0, . . . , n–1, where n is the number of rows in T, a "perfect" bucket sort algorithm with n+1 buckets may be used, which is much faster than a general-purpose sort algorithm. Edges without a parent ($r_P$=NULL) are put into bucket n. By always pushing values to the back of a bucket, stable sorting is achieved, that is, the relative order among rows with identical $r_P$ values (and thus the SEARCH BY order, if specified) is preserved.

(Step c.) After bucket sorting, β builds the hierarchy index during a depth-first traversal of the edges. The traversal is straightforward, starting with entries in bucket n, which correspond to roots in the hierarchy. Since a bucket Bi contains all rows with $r_P$=i the children of a node $r_P$ can be looked up by inspecting its respective bucket.

For each node visited during the traversal, a corresponding entry is incorporated into the indexing scheme and a value is added to the NODE column. This is the only index-specific part of the algorithm. For example, with the PSL scheme the current pre-rank and level are tracked for each visited node during the traversal (the pre-rank and level values are inserted before visiting children, the size after visiting children) and encoded into the corresponding NODE field. With DeltaNI, an entry is added to the auxiliary structure and a handle to this entry is inserted into the NODE field for each visited node.

The algorithm as described so far always builds the complete hierarchy even if a START WHERE clause is specified. Handling the clause is straightforward: Before executing β, all rows satisfying start condition σ are marked. Then, during the traversal, only marked nodes and their descendants are added. All other nodes are visited but not added to the index.

In this manner the whole hierarchy is traversed even if only a few leaf nodes qualify for 94. A recursive variant of β that traverses only the qualifying nodes and their descendants is to first select all qualifying rows $R_\sigma$, and then perform a recursive join starting from rows in $R_\sigma$ in order to enumerate all reachable nodes. However, a recursive join is much more expensive than an ordinary join, so the recursive variant should only be chosen if the sub-hierarchy $H_\sigma$ spanned by $R_\sigma$ is expected to be very small in comparison to the full hierarchy H. This is not easy to predict, since the size of $H_\sigma$ is not related to the size of $R_\sigma$: Suppose, for example, $R_\sigma$ contains only a single node $v_0$, so a native query optimizer might choose the recursive algorithm. If $v_0$, however, happens to be the only root of H, then $H_\sigma$=H and the optimizer's choice is bad.

When a SEARCH BY term is specified, the algorithm as described performs a complete SORT before executing the bulk-build. However, sorting can also be deferred until after the bucket sort. This has the advantage that not all rows but only rows within each bucket have to be sorted, which speeds up sorting considerably. A disadvantage is that all columns appearing in the SEARCH BY term (rather than just $r_C$ and $r_P$) must be maintained in the edge list, so the bucket sort is slowed down due to larger rows. Since SEARCH BY is only used for ordered hierarchies, which are uncommon in customer scenarios, some embodiments may omit late sorting, allowing the implementation of β to be compact and reuse of the existing SORT operator.

Figure 7:
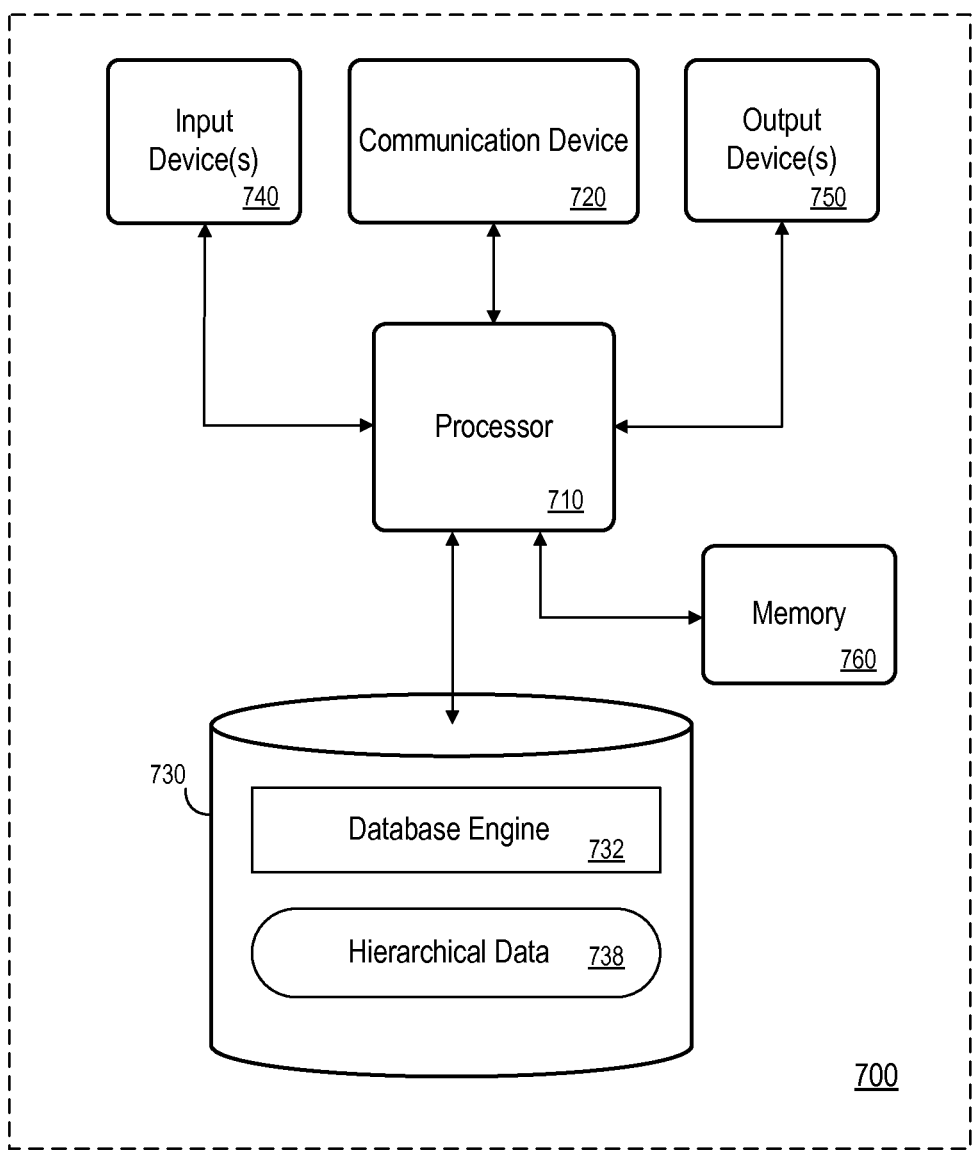
FIG. 7 is a block diagram of a computing system according to some embodiments.

FIG. 7 is a block diagram of system 700 according to some embodiments. System 700 may comprise a general-purpose computing system and may execute program code to perform any of the processes described herein. System 700 may comprise an implementation of database system 100 according to some embodiments. System 700 may include other unshown elements according to some embodiments.

System 700 includes processor 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Database engine 732 may comprise program code executed by processor 710 to cause apparatus 700 to perform any one or more of the processes described herein. For example, database engine 732 may include program code to support the SQL extensions and the DDL and DML constructs described above. Hierarchical data 738 may be implemented as described above. For example, hierarchical data 738 may be in tabular format including a NODE column to abstractly represent node positions within a hierarchy. As also described above, database 100 may be implemented using volatile memory such as memory 760. Data storage device 730 may also store other data and program code for providing additional functionality and/or which are necessary for operation of system 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
    a storage device storing a table, the table comprising a plurality of rows and at least one column, each of the plurality of rows associated with a node of a hierarchy, and one of the at least one columns having a special-purpose data type explicitly, wherein the special-purpose data type in the single column represents an absolute position of a row's associated node within the hierarchy;
    a memory storing processor-executable program code; and
    a processor to execute the processor-executable program code in order to cause the computing system to:
    receive a Structured Query Language query; and
    in response to the query, determine one or more values of the one of the at least one columns, and determine one or more properties of the hierarchy based on the one or more values.

2. A computing system according to claim 1, wherein at least one of the plurality of rows is associated with a second node of a second hierarchy, and a second one of the at least one columns explicitly represents an absolute position of the second node of the at least one of the plurality of rows within the second hierarchy.

3. A computing system according to claim 2, wherein the one or more values of the one of the at least one columns are encoded by a first hierarchy indexing scheme, and
    wherein one or more values of the second one of the at least one columns are encoded by a second hierarchy indexing scheme.

4. A computing system according to claim 1, wherein the one or more values of the one of the at least one columns are encoded by a first hierarchy indexing scheme, and
    wherein the storage device stores a second table, the table comprising a plurality of rows and at least one of column, each of the plurality of rows of the second table associated with a node of a second hierarchy, and one of the at least one columns of the second table explicitly representing an absolute position of a row's associated node within the second hierarchy, and
    wherein one or more values of the one of the at least one columns of the second table are encoded by a second hierarchy indexing scheme.

5. A computing system according to claim 1, wherein the one or more properties is queryable and comprises the number of edges on a path from a root of the hierarchy to a position of a row's associated node.

6. A computing system according to claim 5, wherein the one or more properties comprise one or more of the following: the preorder traversal rank of a row's associated node; and the postorder traversal rank of a row's associated node.

7. A computing system according to claim 1, wherein the one or more properties comprise one or more of the following: whether a row's associated node is a parent of a second row's associated node; whether a row's associated node is a child of a second row's associated node; whether a row's associated node is a sibling of a second row's associated node; whether a row's associated node is a descendant of a second row's associated node; and whether a row's associated node is an ancestor of a second row's associated node.

8. A computing system according to claim 7, wherein the one or more properties comprise one or more of the following: whether a row's associated node precedes a second row's associated node in preorder is not an ancestor of a second row's associated node;
    and whether a row's associated node follows a second row's associated node in preorder is not an ancestor of a second row's associated node.

9. A computing system according to claim 1, the processor to execute the processor-executable program code in order to cause the computing system to:
    receive a second Structured Query Language query; and
    in response to the second query, insert a new row into the table, the new row including a value in the one of the at least one columns explicitly representing an absolute position of the new row's associated node within the hierarchy.

10. A computing system according to claim 5, wherein the one or more properties further comprises at least one of whether a row's associated node is a leaf node;
    and whether a row's associated node is a root.

11. A non-transitory computer-readable medium storing program code, the program code executable by a processor of a computing system to cause a computing system to:
    receive a Structured Query Language query; and
    in response to the query:
    determine one or more values of a first column of a stored table comprising a plurality of rows and at least one column having a special-purpose data type, each of the plurality of rows associated with a node of a hierarchy, and a value of the first column of a row explicitly, wherein the special-purpose data type in the single column represents an absolute position of the row's associated node within the hierarchy; and
    determine one or more properties of the hierarchy based on the one or more values.

12. A non-transitory computer-readable medium according to claim 11, wherein at least one of the plurality of rows is associated with a second node of a second hierarchy, and a second one of the at least one columns explicitly represents an absolute position of the second node of the at least one of the plurality of rows within the second hierarchy.

13. A non-transitory computer-readable medium according to claim 12, wherein the one or more values of the one of the at least one columns are encoded by a first hierarchy indexing scheme, and
    wherein one or more values of the second one of the at least one columns are encoded by a second hierarchy indexing scheme.

14. A non-transitory computer-readable medium according to claim 11, wherein the one or more values of the one of the at least one columns are encoded by a first hierarchy indexing scheme, and wherein the storage device stores a second table, the table comprising a plurality of rows and at least one of column, each of the plurality of rows of the second table associated with a node of a second hierarchy, and one of the at least one columns of the second table explicitly representing an absolute position of a row's associated node within the second hierarchy, and wherein one or more values of the one of the at least one columns of the second table are encoded by a second hierarchy indexing scheme.

15. A non-transitory computer-readable medium according to claim 11, wherein the one or more properties comprises the number of edges on a path from a root of the hierarchy to a position of a row's associated node; and one or more of the following:

whether a row's associated node is a leaf node; and whether a row's associated node is a root.

16. A non-transitory computer-readable medium according to claim 15, wherein the one or more properties comprise one or more of the following: the preorder traversal rank of a row's associated node; and the postorder traversal rank of a row's associated node.

17. A non-transitory computer-readable medium according to claim 11, wherein the one or more properties comprise one or more of the following: whether a row's associated node is a parent of a second row's associated node; whether a row's associated node is a child of a second row's associated node; whether a row's associated node is a sibling of a second row's associated node; whether a row's associated node is a descendant of a second row's associated node; and whether a row's associated node is an ancestor of a second row's associated node.

18. A non-transitory computer-readable medium according to claim 17, wherein the one or more properties comprise one or more of the following: whether a row's associated node precedes a second row's associated node in preorder is not an ancestor of a second row's associated node; and whether a row's associated node follows a second row's associated node in preorder is not an ancestor of a second row's associated node.

19. A non-transitory computer-readable medium according to claim 11, the program code further executable by a processor of a computing system to cause a computing system to:

receive a second Structured Query Language query; and in response to the second query, insert a new row into the table, the new row including a value in the one of the at least one columns explicitly representing an absolute position of the new row's associated node within the hierarchy.

\* \* \* \* \*